(12) United States Patent
Algoso et al.

(10) Patent No.: US 11,454,480 B1
(45) Date of Patent: Sep. 27, 2022

(54) METHODS FOR FORMING MUNITIONS CASINGS AND CASINGS AND MUNITIONS FORMED THEREBY

(71) Applicant: Corvid Technologies LLC, Mooresville, NC (US)

(72) Inventors: Anne Marie Algoso, Arlington, VA (US); Brandon Alexander Horton, Charlotte, NC (US)

(73) Assignee: Corvid Technologies LLC, Mooresville, NC (US)

( * ) Notice: Subject to any disclaimer, the term of this patent is extended or adjusted under 35 U.S.C. 154(b) by 254 days.

(21) Appl. No.: 16/837,471

(22) Filed: Apr. 1, 2020

Related U.S. Application Data

(60) Provisional application No. 62/860,587, filed on Jun. 12, 2019.

(51) Int. Cl.
*F42B 12/24* (2006.01)
*B23H 11/00* (2006.01)
*B23H 9/14* (2006.01)

(52) U.S. Cl.
CPC .............. *F42B 12/24* (2013.01); *B23H 9/14* (2013.01); *B23H 11/00* (2013.01)

(58) Field of Classification Search
CPC ................................. F42B 12/22; F42B 12/24
See application file for complete search history.

(56) References Cited

U.S. PATENT DOCUMENTS

| | | | | |
|---|---|---|---|---|
| 333,955 | A * | 1/1886 | Kennish | F42B 12/22 102/493 |
| 2,309,360 | A | 1/1943 | Southwell et al. | |
| 2,798,431 | A * | 7/1957 | Semon | F42B 12/28 102/495 |
| 3,000,309 | A | 9/1961 | Zapf | |
| 3,156,188 | A * | 11/1964 | Zernow | F42B 12/22 102/491 |
| 3,298,096 | A | 1/1967 | Stuart | |
| 3,383,900 | A | 5/1968 | Hartesveldt | |
| 3,425,350 | A * | 2/1969 | Giannino | F42B 12/22 102/495 |
| 3,491,694 | A | 1/1970 | Fountain | |
| 3,495,434 | A | 2/1970 | Lavine | |
| 3,655,466 | A | 4/1972 | Bysink et al. | |
| 3,783,790 | A | 1/1974 | Polcha | |
| 3,820,464 | A | 6/1974 | Dixon | |
| 3,956,989 | A | 5/1976 | Sallade et al. | |

(Continued)

FOREIGN PATENT DOCUMENTS

| | | |
|---|---|---|
| DE | 2919268 A1 | 11/1980 |
| EP | 0119182 A1 | 9/1984 |

(Continued)

OTHER PUBLICATIONS

"Electrical discharge machining" Wikipedia, Retrieved from URL: https://en.wikipedia.org/wiki/Electrical_discharge_machining (Retrieved on May 16, 2019).

(Continued)

*Primary Examiner* — Derrick R Morgan

(74) *Attorney, Agent, or Firm* — Myers Bigel, P.A.

(57) ABSTRACT

A method for forming a fragmentation explosive munition includes providing a casing, and forming holes in the casing using electrical discharge machining (EDM), thereby forming a modified casing.

19 Claims, 9 Drawing Sheets

(56) References Cited

U.S. PATENT DOCUMENTS

| | | | |
|---|---|---|---|
| 4,043,808 A | 8/1977 | Watmough et al. | |
| 4,151,014 A | 4/1979 | Charschan et al. | |
| 4,304,978 A | 12/1981 | Saunders | |
| 4,305,333 A | 12/1981 | Altenau et al. | |
| 4,312,274 A | 1/1982 | Zernow | |
| 4,461,947 A | 7/1984 | Ward | |
| 4,467,168 A | 8/1984 | Morgan et al. | |
| 4,467,171 A | 8/1984 | Ramos | |
| 4,592,283 A * | 6/1986 | Hellner | F42B 12/22 102/493 |
| 4,664,035 A | 5/1987 | Osofsky | |
| 4,986,188 A | 1/1991 | Denis et al. | |
| 5,040,464 A | 8/1991 | Pearson | |
| 5,095,821 A | 3/1992 | Merz | |
| 5,131,329 A | 7/1992 | Lips et al. | |
| 5,157,225 A * | 10/1992 | Adams | F42B 12/24 102/493 |
| 5,166,471 A * | 11/1992 | Maselli | B22F 7/06 102/491 |
| 5,337,673 A | 8/1994 | Koontz et al. | |
| 6,484,642 B1 | 11/2002 | Kuhns et al. | |
| 6,502,515 B2 | 1/2003 | Burckhardt et al. | |
| 6,581,522 B1 * | 6/2003 | Julien | F42B 5/192 102/431 |
| 6,615,738 B2 | 9/2003 | Lecume | |
| 6,817,299 B1 | 11/2004 | Cooke | |
| 6,857,372 B2 | 2/2005 | Renaud-Bezot et al. | |
| 6,962,634 B2 | 11/2005 | Nielson et al. | |
| 7,093,542 B2 | 8/2006 | Gousman et al. | |
| 7,451,704 B1 * | 11/2008 | Gold | F42B 12/205 102/494 |
| 7,886,667 B1 * | 2/2011 | Baker | F42B 12/22 102/493 |
| 7,921,778 B2 | 4/2011 | Stawovy | |
| 8,272,329 B1 * | 9/2012 | Hsieh | F42B 12/24 102/494 |
| 8,272,330 B1 | 9/2012 | Gold et al. | |
| 8,276,520 B1 | 10/2012 | Fong et al. | |
| 8,522,685 B1 * | 9/2013 | Gold | F42B 12/28 102/494 |
| 8,770,110 B2 | 7/2014 | Ames et al. | |
| 8,973,503 B2 | 3/2015 | Dunaway et al. | |
| 9,329,009 B1 | 5/2016 | Moore | |
| 9,360,284 B1 | 6/2016 | Moore | |
| 9,423,228 B2 | 8/2016 | Moan et al. | |
| 9,733,052 B2 | 8/2017 | Moore | |
| 9,738,947 B1 | 8/2017 | Deshpande et al. | |
| 9,738,948 B2 | 8/2017 | Gwaltney et al. | |
| 9,784,541 B1 * | 10/2017 | Genson | F42B 12/207 |
| 10,415,939 B2 * | 9/2019 | Pichler | F42B 12/22 |
| 10,578,411 B2 * | 3/2020 | Jennett | F42B 12/207 |
| 2003/0173459 A1 * | 9/2003 | Fanucci | F42B 10/143 244/123.2 |
| 2005/0040098 A1 * | 2/2005 | Chen | A61M 1/3633 210/348 |
| 2005/0182494 A1 * | 8/2005 | Schmid | F16C 11/068 384/322 |
| 2008/0184873 A1 | 8/2008 | Martini | |
| 2009/0050334 A1 | 2/2009 | Marya et al. | |
| 2010/0042167 A1 * | 2/2010 | Nebosky | A61B 17/864 606/301 |
| 2010/0242774 A1 | 9/2010 | Arrenbrecht et al. | |
| 2013/0255524 A1 | 10/2013 | Simon et al. | |
| 2014/0230682 A1 | 8/2014 | Bonnstetter et al. | |
| 2015/0217414 A1 * | 8/2015 | Luick | B23K 26/32 428/213 |
| 2015/0238324 A1 * | 8/2015 | Nebosky | A61F 2/3094 623/17.16 |
| 2015/0292306 A1 * | 10/2015 | Collins | F42B 3/08 102/306 |
| 2016/0245626 A1 * | 8/2016 | Drieling | F42B 5/285 |
| 2016/0363165 A1 * | 12/2016 | Lin | F16C 32/0622 |
| 2016/0367720 A1 | 12/2016 | Pawar et al. | |
| 2017/0051374 A1 | 2/2017 | Gwaltney et al. | |
| 2017/0131079 A1 | 5/2017 | Moore | |
| 2017/0240986 A1 | 8/2017 | Deshpande et al. | |
| 2021/0381813 A1 * | 12/2021 | Burrow | C22C 38/04 |

FOREIGN PATENT DOCUMENTS

| | | | | |
|---|---|---|---|---|
| FR | 1564933 A | 4/1969 | | |
| FR | 2110026 A5 | 5/1972 | | |
| FR | 2173303 A1 | 10/1973 | | |
| FR | 2402003 A1 | 3/1979 | | |
| FR | 2566691 A1 * | 6/1984 | | F42B 12/24 |
| FR | 2560375 A1 | 8/1985 | | |
| FR | 2566691 A1 | 1/1986 | | |
| FR | 2590823 A1 | 6/1987 | | |
| FR | 2678686 A1 | 1/1993 | | |
| GB | 1037295 A | 7/1966 | | |
| GB | 1150914 A | 5/1969 | | |
| GB | 1342093 A | 12/1973 | | |
| GB | 1503143 A * | 3/1978 | | C21D 9/16 |
| JP | S60193636 A | 10/1985 | | |
| JP | S60225735 A | 11/1985 | | |

OTHER PUBLICATIONS

Patwa et al. "Laser drilling of micro-hole arrays in tantalum" Journal of Laser Applications 27(S2):S28006 (Feb. 2015).

Stahl, Rosemarie "What is Electrical Discharge Machining and how does it work?" ETMM (6 pages) (Feb. 23, 2018).

Villano et al. "Innovative Technologies for Controlled Fragmentation Warheads" Journal of Applied Mechanics 80(3):031704 (May 2013).

* cited by examiner

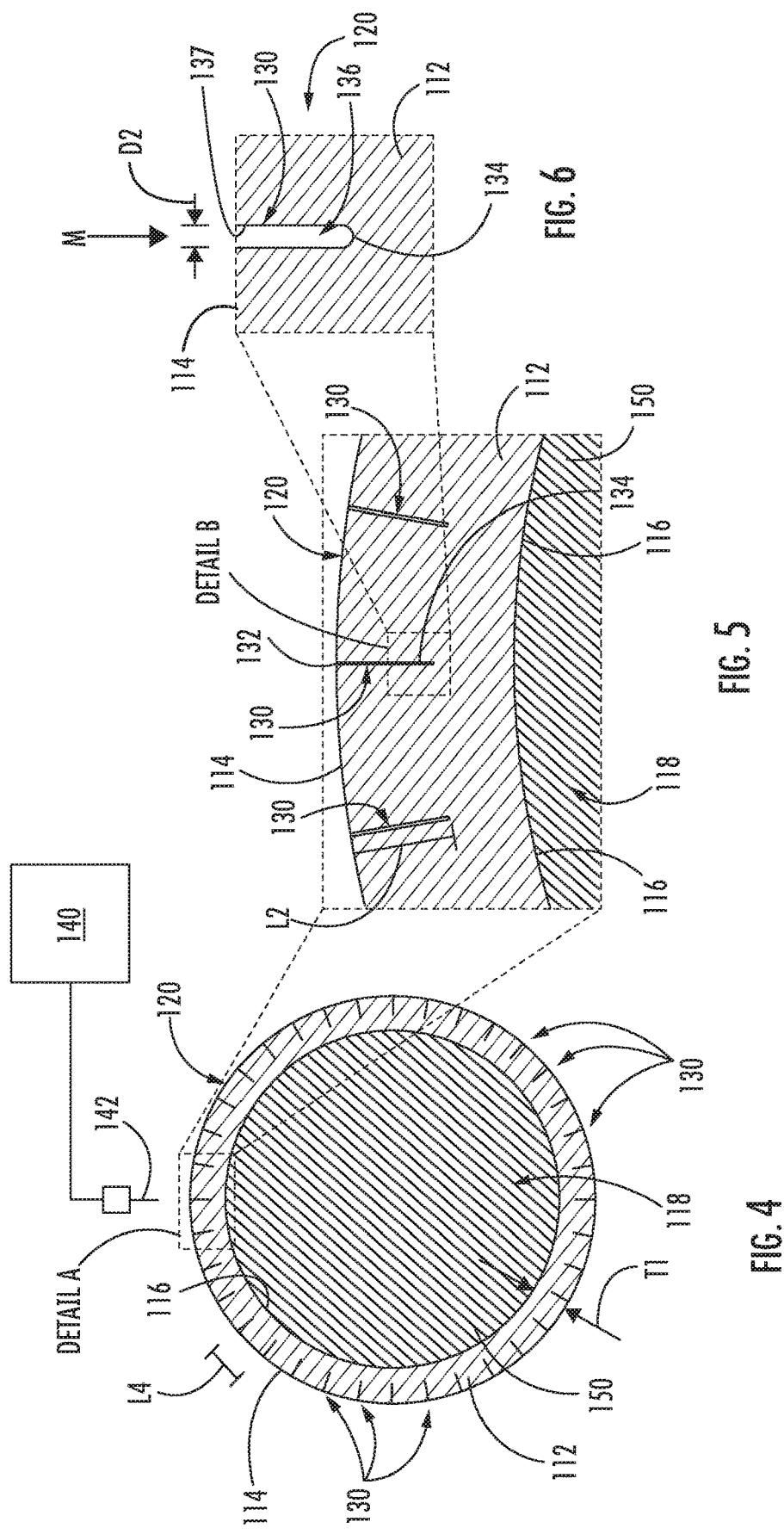

PRISTINE

DRILLED (OFFSET PATTERN)

METHODS FOR FORMING MUNITIONS CASINGS AND CASINGS AND MUNITIONS FORMED THEREBY

RELATED APPLICATION

The present application claims the benefit of and priority from U.S. Provisional Patent Application No. 62/860,587, filed Jun. 12, 2019, the disclosure of which is incorporated herein by reference in its entirety.

STATEMENT OF GOVERNMENT SUPPORT

This invention was made with support under "Microstructural Treatment of Munitions Cases to Improve Performance" Contract No. FA8651-18-P-0046 awarded by Air Force Research Laboratory Munitions Directorate (AFRL/RWK). The Government has certain rights in the invention.

FIELD

The present invention relates to munitions and, more particularly, to munitions including fragment projectiles.

BACKGROUND

Munitions such as bombs and missiles are used to inflict damage on targeted personnel and material. Some munitions of this type include a warhead including a plurality of projectiles and high explosive to project the projectiles at high velocity. Fragmentation explosive munitions include a casing surrounding an explosive charge. When the charge is detonated, explosive energy from the charge causes the casing to break into fragments that are projected at high velocity from the munition.

Natural fragmentation of a typical cylindrical fragmentation casing of a munition results in poor fragmentation performance. Cylindrical bodies have a tendency to produce long strips of material, reducing the effective area and likelihood of a hit on target. Traditional approaches for controlled fragmentation include forming notches or grooves in the casing on the order of 1-10 mm in depth to control the fragment size distribution and shape. However, new methods are needed that do not significantly alter the surface of the munition's casing to meet flight safety requirements and are suitable for manufacturing penetration warheads.

Some fragmentation strategies use a double wall construction with scored walls or preformed fragments, which can produce improved fragmentation without changing the outer wall profile of the munition. However, such methods double the tooling required, leading to high manufacturing costs.

Changing the microstructure of a munition's case offers a solution to create stress concentrations and manipulate the fracture lines without significantly changing the munition's outer wall profile. Laser microdrilling is a new technology that drills micron-sized holes in material. The use of laser microdrilling has been demonstrated to provide better fragmentation performance than other chemical, thermal, and mechanical methods for the DART and Vulcano family munitions because of its ability to drill deep into the material. For these munitions, a geometric pattern of microholes were drilled 30-50 percent through the material thickness of the casing to weaken the munition's casing and create fragments of a desired size. These microhole diameters were less than 1 mm (or smaller than a pin head), producing no significant altering of the casing material's surface.

A challenge for applying laser microdrilling to the Mk-80 family of munitions is the increase in case thickness, which is on the order of 1-2 inches, as opposed to the ⅛ inch thick DART/Vulcano munitions. Aspect ratios of the microhole would need to be approximately 127:1 for a 100 μm diameter hole to reach half the thickness (0.5 in or 12.7 mm) for effective fracture. Research has shown that it is currently difficult to achieve these aspect ratios with laser microdrilling in metals. R. Patwa et al. "Laser drilling of micro-hole arrays in tantalum," *Journal of Laser Applications* 27, S28006 (2015) demonstrated 60:1 in tantalum, but most laser drilling machines can only achieve 10:1. In addition, laser micro-drilling is prone to cracks in the microstructure of the material, making it susceptible to early fatigue failure. Lastly, laser processes have long drill times for deep holes, making it difficult for mass production.

SUMMARY

According to some embodiments, a method for forming a fragmentation explosive munition includes providing a casing, and forming holes in the casing using electrical discharge machining (EDM), thereby forming a modified casing.

In some embodiments, the casing is formed of metal.

In some embodiments, the metal includes a metal selected from the group consisting of steel and titanium.

According to some embodiments, the casing has an outer surface and forming holes in the casing includes forming the holes in the outer surface.

According to some embodiments, the method includes heat treating the casing prior to forming the holes.

According to some embodiments, the method includes filling the casing with explosive material after forming the holes.

In some embodiments, the explosive material is a high energy (HE) explosive.

In some embodiments, the holes each have a depth in the range of from about 25% to 75% of a thickness of the casing.

In some embodiments, the holes each have an inner diameter in the range of from about 100 μm to 600 μm.

According to some embodiments, the holes each have a depth in the range of from about 25% to 75% of a thickness of the casing, and an inner diameter in the range of from about 100 μm to 600 μm.

In some embodiments, forming holes in the casing includes forming the holes in the casing using a hole drilling electrical discharge machine.

In some embodiments, the casing is substantially tubular.

According to some embodiments, the casing has a substantially cylindrical, conical or frustoconical outer surface.

According to some embodiments, forming holes in the casing includes forming the holes in the casing in an offset pattern.

In some embodiments, the offset pattern includes sequential rows of the holes that are angularly offset or rotated with respect to one another about a munition axis.

According to some embodiments, forming holes in the casing includes forming the holes such that the spacing between adjacent holes is in the range of from about 0.1 inch to 5 inches.

According to some embodiments, a method for forming a munition casing includes providing a casing, and forming holes in the casing using electrical discharge machining (EDM).

According to some embodiments, a munition is formed by the process of providing a casing, forming holes in the casing using electrical discharge machining (EDM); and thereafter, filling the casing with explosive material after forming the holes.

In some embodiments, the munition is a penetration munition.

According to some embodiments, a munition casing is formed by the process of providing a casing, and forming holes in the casing using electrical discharge machining (EDM).

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

FIG. 4 is a cross-sectional view of the munition of FIG. 1 taken along the line 4-4 of FIG. 2.

FIG. 5 is an enlarged view of Detail A of FIG. 4.

FIG. 6 is an enlarged view of Detail B of FIG. 5.

DESCRIPTION

Figure 1:
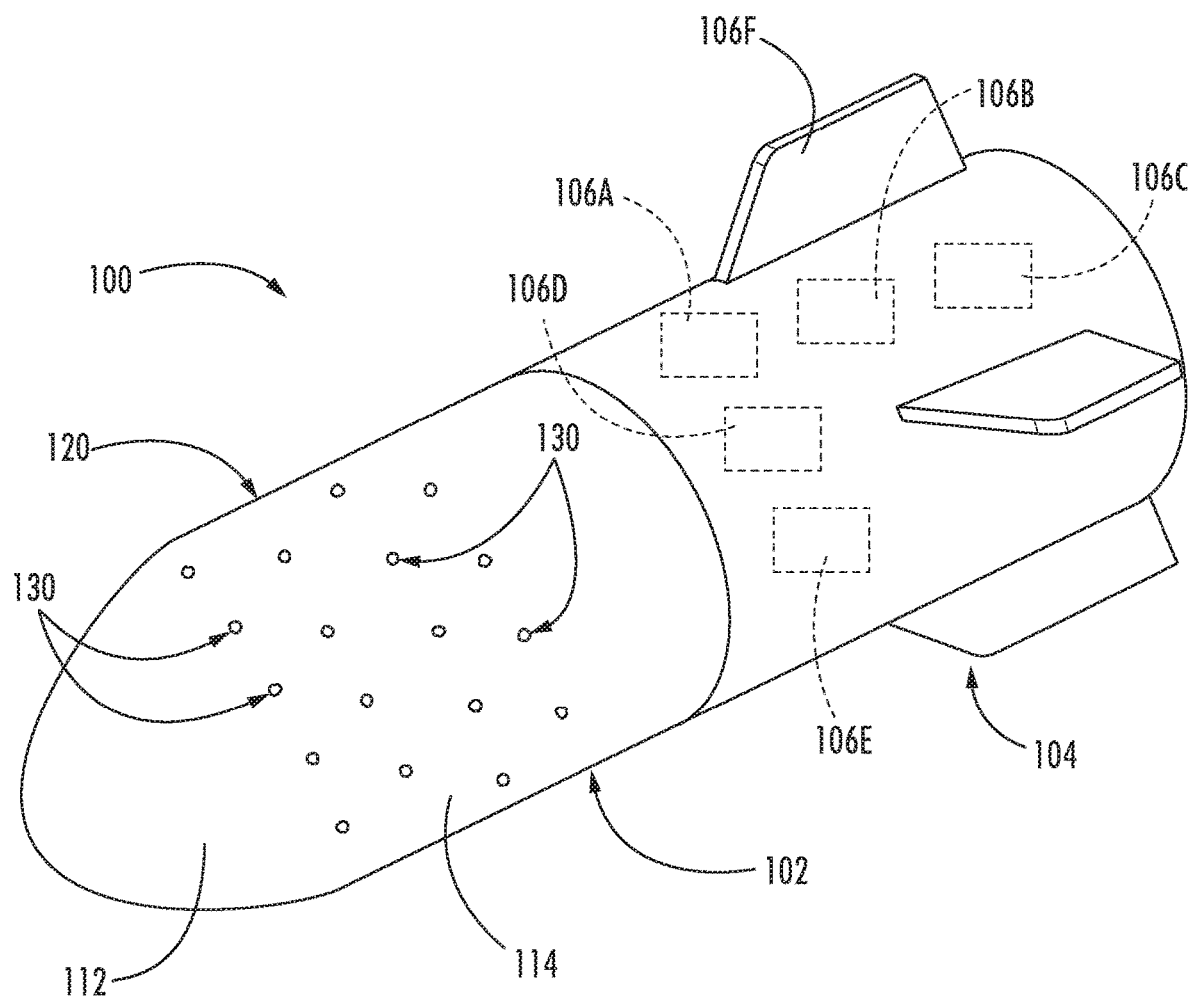
FIG. 1 is a perspective view of a munition according to some embodiments.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

Embodiments of the invention relate to munitions such as missiles and bombs intended for use against personnel and materiel.

The present invention is directed to methods for forming a modified fragmentation explosive munition casing including forming holes in a casing using electrical discharge machining (EDM). The present invention is further directed to methods for forming a fragmentation explosive munition including the modified casing. The present invention is further directed to fragmentation explosive munitions and casings formed using these methods.

Embodiments of the invention are directed to methods of controlling the fragment size of a naturally fragmenting munition by leveraging electrical discharge machining (EDM) technology. Microholes are drilled into the exterior of a casing of the munition using EDM in such a way that the munition fragmentation performance of the munition is improved without a significant loss in mechanical strength of the munition.

In accordance with embodiments of the invention, small hole EDM drilling is used to create micron-sized holes in thick metal (e.g., steel) cased munitions. Each of these microholes provides an initiation site for the munition's casing to fracture as it expands under explosive loading.

With an appropriate hole depth and spacing, the holes will allow the casing to fail in a desired path. Specifying these microholes in a certain pattern (diameter, depth, spacing) can create fracture lines allowing design for a desired fragment size. The inventors have used high-fidelity physics-based codes to demonstrate the success of this approach and performance gain when compared to a naturally fragmenting baseline.

In some embodiments of the present invention, EDM is used to drill microholes to improve fragmentation performance of munitions. In some embodiments, each of these microholes has an inner diameter in the range of 0.008 to 0.016 inch or 200 to 400 µm. Due to the capabilities of EDM, these holes can be drilled into the material after the munition casing has been produced and heat-treated as part of its manufacturing process. Therefore, the casing (prior to forming the holes) can be manufactured using any desired suitable manufacturing process, which may include known or conventional manufacturing processes, for example. After drilling, the munition can be filled with an explosive material without the need for any special interior liners since the inner wall profile remains unaffected. In some embodiments, the explosive material is a high energy (HE) explosive material.

Thus, in accordance with embodiments of the invention, methods are provided for forming a naturally fragmenting casing for a munition, the method including using EDM microdrilling to control fragmentation of the casing when the naturally fragmenting munition is exploded. The casing is microstructurally treated by forming the microholes in the casing. This method or process can be performed without affecting other steps of the munition or casing manufacturing process. This method or process can be performed to control fragmentation without significantly reducing the strength of the material (yield strength or ultimate tensile strength (UTS)). In accordance with some embodiments, an offset hole pattern can be used with EDM to improve natural fragmentation performance.

With reference to FIGS. 1-6, a munition 100 according to some embodiments and formed according to methods of the invention is shown therein. The munition 100 includes a modified shell or casing 120 (FIGS. 1, 2 and 4-6) and an explosive material or charge 150 (FIG. 4) disposed in the modified casing 120. In some embodiments, the explosive charge 150 is formed of high energy (HE) material.

The modified casing 120 and the explosive charge 150 may collectively constitute or form parts of a warhead 102 (FIG. 1), for example. The munition 100 may, in some embodiments, further include additional components or sections, such as a tail section 104 and/or a nose section. The additional section(s) may include a controller 106A, a guidance system 106B (e.g., including a seeker), a trigger or deployment system 106C (e.g., including a fuze), a propulsion system 106D, and/or a steering system 106E (e.g., controllable airflow or flight control surfaces 106F). It will be appreciated that the illustrated munition 100 is exemplary, and munitions in accordance with the present invention may take any suitable form and incorporate any suitable components and features.

The modified casing 120 and the munition 100 may be formed as follows in accordance with some methods of the invention. The construction and aspects of the modified casing 120 and the munition 100 will be better appreciated from the discussion of these methods.

Figure 8:
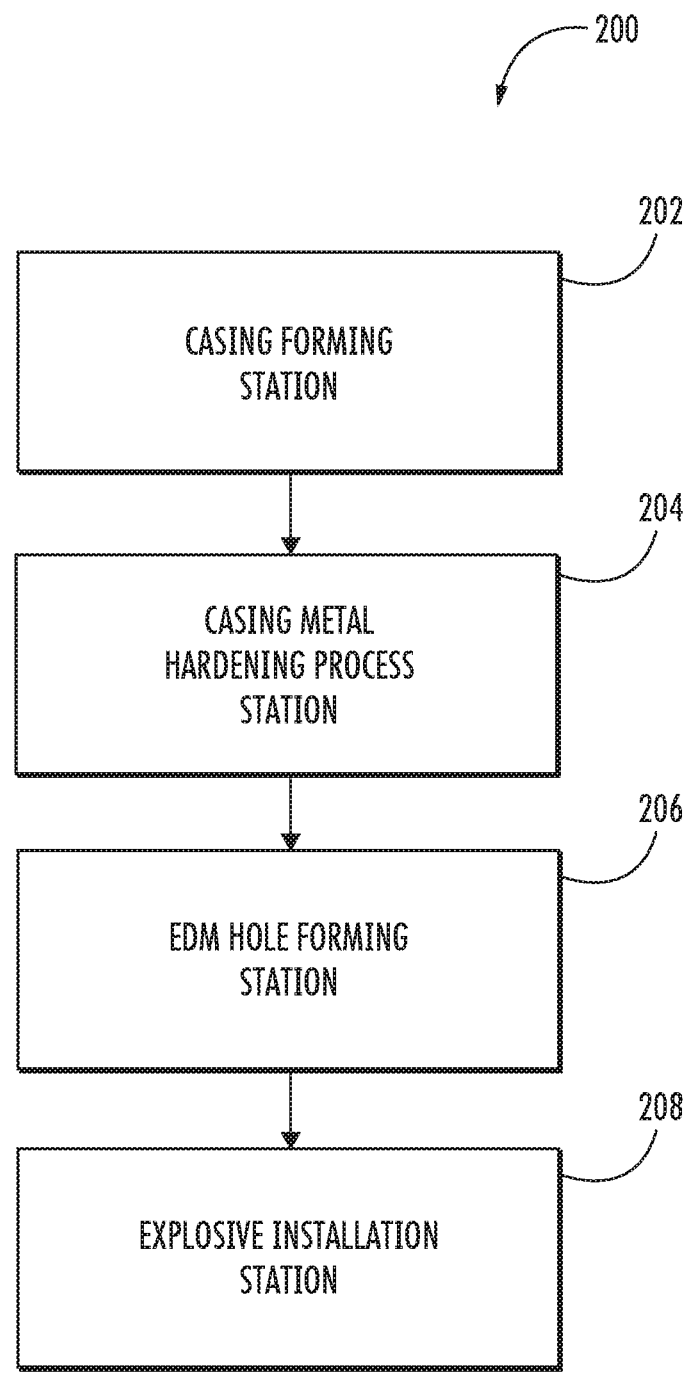
FIG. 8 is a schematic diagram of a munition manufacturing system according to some embodiments for forming the munition of FIG. 1.
Figure 9:
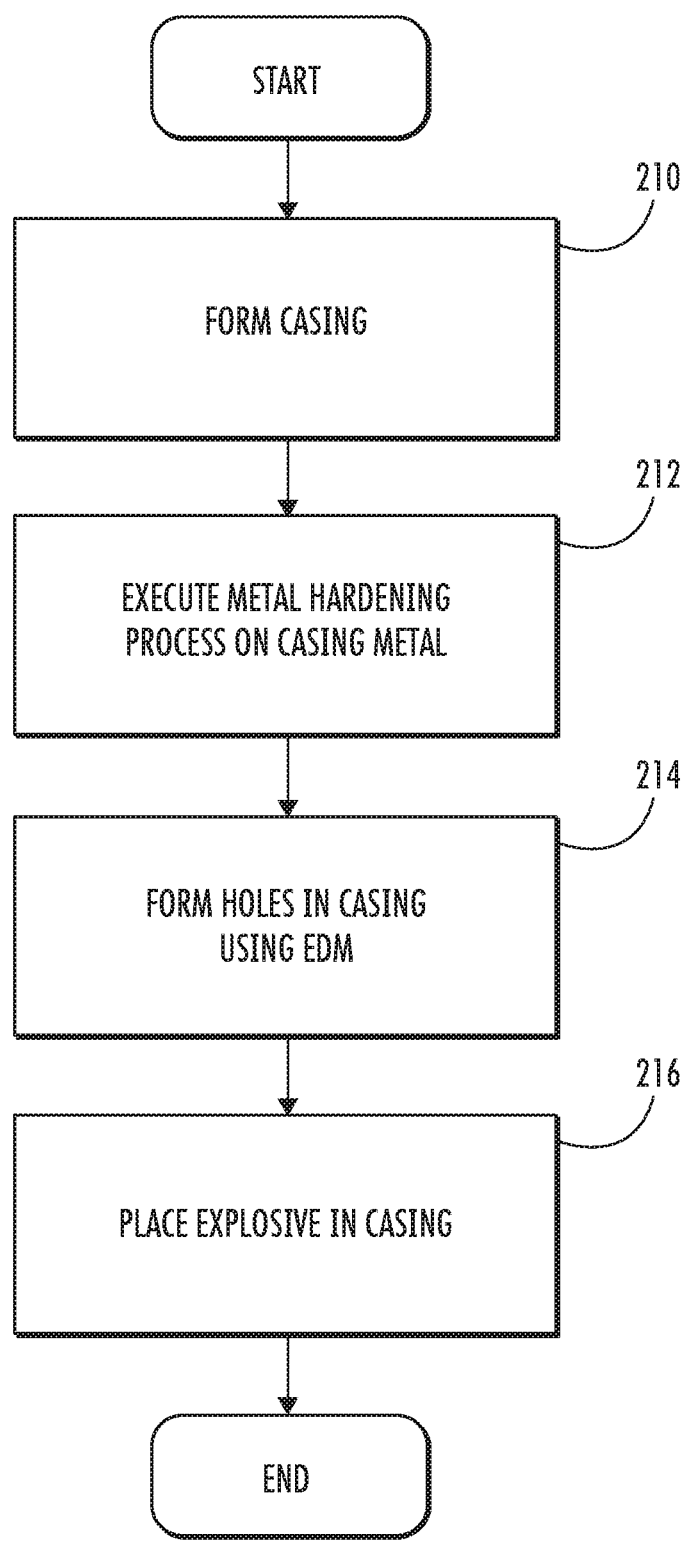
FIG. 9 is a flowchart representing methods according to some embodiments for forming the munition of FIG. 1.

FIG. 9 is a flowchart representing methods for forming or manufacturing the modified casing and the munition 100 in accordance with some methods of the invention. With reference to FIG. 8, a munition manufacturing system 200 according to some embodiments is shown schematically therein and may be used to execute the method and steps of FIG. 9.

The munition manufacturing system 200 includes a casing forming station 202, a casing hardening station 204, an EDM hole forming station 206, and an explosive installation station 208. The stations 202-208 are exemplary and may each be divided into multiple stations or may be combined. The stations 202-208 may be co-located at the same site, or may be spatially or geographical distributed.

Figure 7:
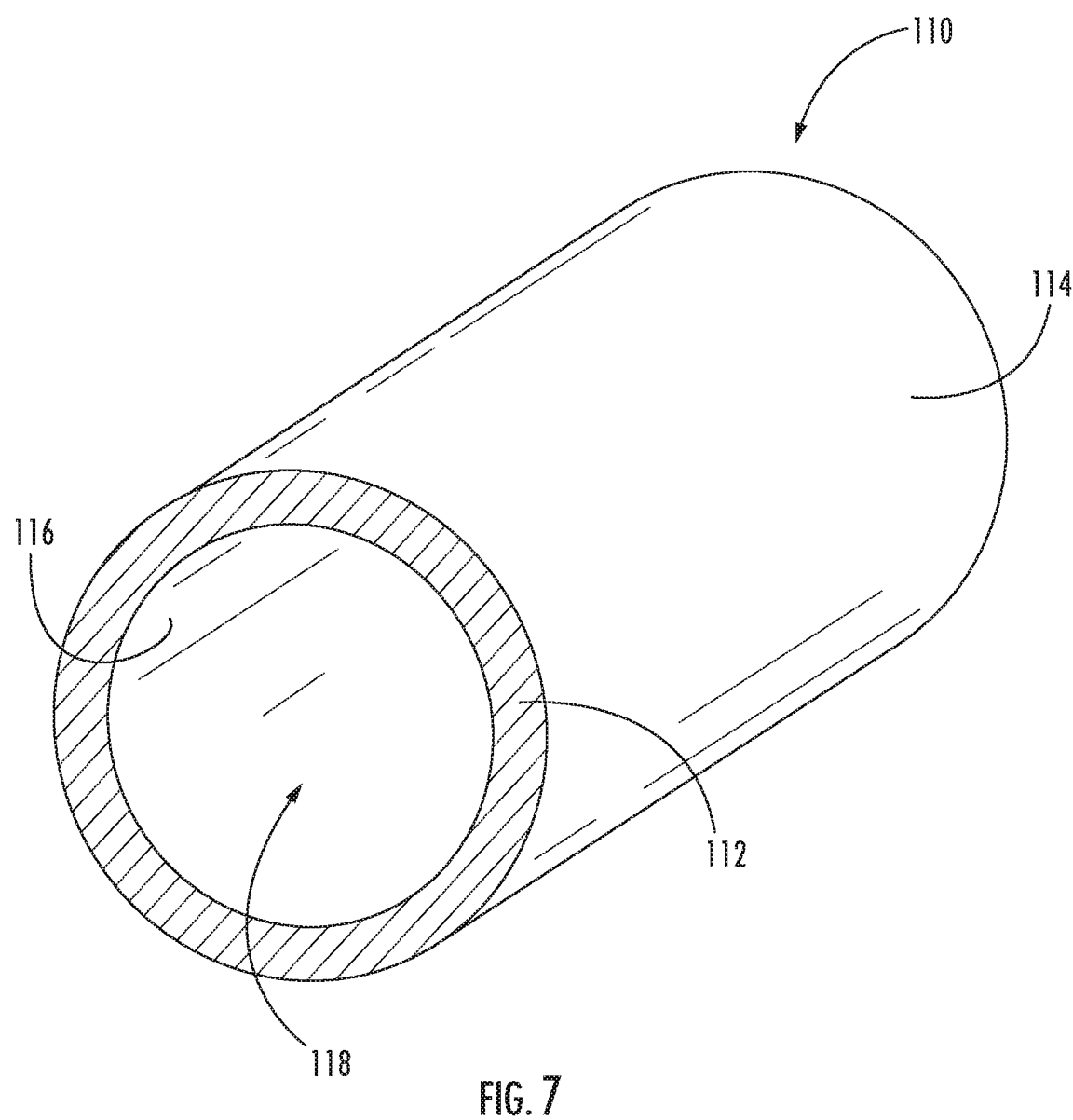
FIG. 7 is a fragmentary, perspective view of a casing used to form the modified casing of the munition of FIG. 1.

Referring now to FIG. 9, a casing 110 (FIG. 7) is formed (Block 210) (using the casing forming station 202, for example). The shell or casing 110 is formed using any suitable technique. In some embodiments, the casing 110 is cast. In some embodiments, the casing 110 is unitarily formed or cast. In some embodiments, the casing 110 is monolithic.

The casing 110 is formed of an electrically conductive material. In some embodiments, the casing 110 is formed of metal. In some embodiments, the casing 110 is formed of a metal selected from the group consisting of steel and titanium.

The casing 110 includes a casing wall 112 having an outer surface 114 and an opposing inner surface 116. The casing 110 may be formed in any suitable shape. In some embodiments, an outer surface 114 of the casing 110 is generally cylindrical, conical or frustoconical. The inner surface 116 of the casing 110 defines a cavity 118.

In some embodiments, a nominal thickness T1 (FIG. 4) of the casing wall 112 is in the range of from about 0.5 inch to 2 inches.

In some embodiments, the casing 110 is metal and a metal hardening process is then executed on the formed casing 110 (Block 212) (using the casing metal hardening process station 204, for example). The metal hardening process treats the metal of the casing 110 to thereby harden the metal. In some embodiments, the metal casing 110 is heat treated to harden the metal of the casing 110.

A hole forming step or procedure is then executed on the casing 110 to form the modified shell or casing 120 (Block 214) (using the EDM hole forming station 206, for example). In the hole forming step, a plurality of holes 130 are formed in the casing wall 112 in a transverse or radial direction M (FIG. 6) through the thickness T1 of the casing wall 112. Each hole 130 is formed by electrical discharge machining (EDM) using an electrical discharge machine 140 (depicted schematically in FIG. 4). In some embodiments, each hole 130 is formed by hole drilling EDM using a small hole drilling electrical discharge machine. The machine 140 and technique may also be referred to as a hole popping EDM machine and technique. The sizes of the holes 130 may be exaggerated in some of the drawings for the purpose of explanation and clarity.

In the EDM drilling step, the EDM machine 140 positions an electrode 142 (FIG. 4) adjacent the casing outer surface 114. The machine 140 directs a high frequency electrical spark from an electrode to the outer surface 114 to erode metal from the casing wall 112 in a controlled manner. A dielectric fluid (e.g., deionized water) is directed by the machine 140 into the affected region to flush away particles of the metal casing wall 112 that have been eroded by the spark. The machine 140 continues to drive the electrode 142 into the hole as the hole is formed. In some embodiments, the machine 140 rotates the electrode 142 in the hole as the hole is being formed. Once the hole 130 is formed, the machine 140 withdraws the electrode 142, repositions the electrode, and drills the next hole 130.

In some embodiments, the metal casing 110 is treated to harden the metal (e.g., heat treated; Block 212; FIG. 9) prior to the step of drilling the holes 130 using EDM (Block 214). This step may be executed using the casing metal hardening process station 204, for example (FIG. 8). In this case, the holes 130 are drilled into hardened metal of the casing 110.

The EDM machine 140 may be any suitable apparatus. Suitable apparatus may include the EDBV8 EDM hole drilling machine or the BX3 EDM hole drilling machine available from Makino of Japan.

The EDM machine 140 may use any suitable dielectric fluid.

In some embodiments and as illustrated in FIGS. 5 and 6, each formed hole 130 has an opening 132 at the outer surface 114, a closed bottom 134 proximate and spaced apart from the inner surface 116, and a bore section 136 extending between the opening 132 and the bottom 134 (i.e., the hole 130 is a blind hole). Each hole 130 is defined by an inner bore surface 137 (FIG. 6) of the sidewall 112.

In some embodiments, the each hole 130 has a depth L2 (FIG. 5) in the range of from about 25% to 75% of the casing wall thickness T1.

In some embodiments, each hole 130 has an inner diameter D2 (FIG. 6) in the range of from about 100 μm to 600 μm. In some embodiments, the inner diameter D2 of each hole 130 is substantially uniform from its opening 132 to its bottom 134.

In some embodiments, the spacing L4 (FIG. 4) between adjacent ones of the holes 130 (i.e., the distance between each hole 130 and the nearest adjacent hole 130) is in the range of from about 0.1 inch to 5 inches.

In some embodiments, the ratio of the hole length L2 to the hole diameter D2 is at least 50. In some embodiments, the ratio of the hole length L2 to the hole diameter D2 is in the range of from about 50 to 250.

In some embodiments, the density of the holes 130 in a selected portion of the modified casing 120 is at least 1 hole/square inch. In some embodiments, the density of the holes 130 in the selected portion of the modified casing 120 is in the range of from about 1 to 9 holes/square inch.

Figure 2:
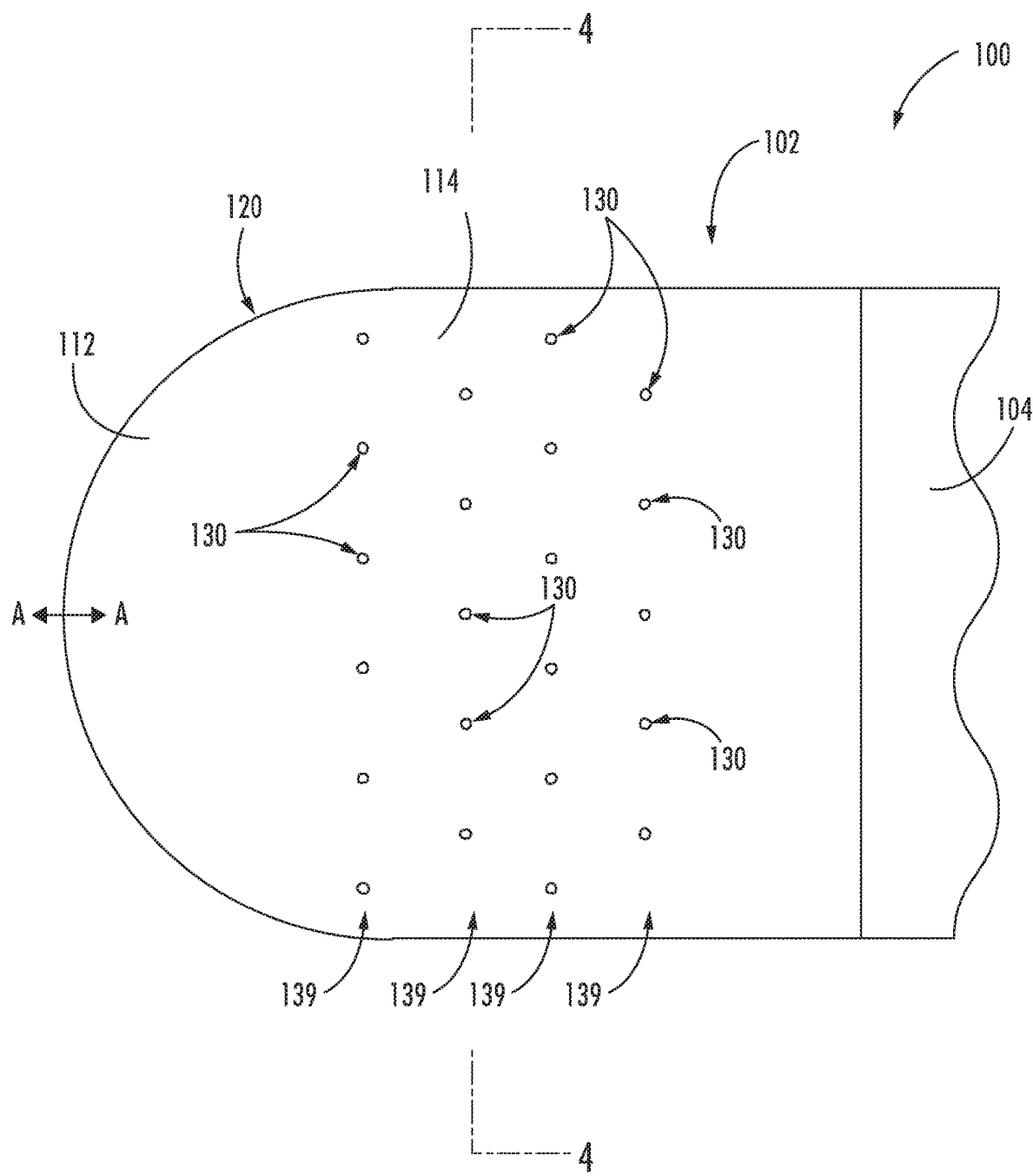
FIG. 2 is a fragmentary, side view of the munition of FIG. 1.

In some embodiments, the holes 130 are arranged or formed in an offset pattern. In some embodiments and as shown in FIG. 2, a series of circumferentially extending rows 139 of the holes 130 are formed along a longitudinal munition axis of the casing 120. The rows 139 are axially spaced apart from one another along a longitudinal axis A-A of the modified casing 120. The rows 139 are rotated or angularly offset with respect to one another about the axis A-A. That is, the spaced apart holes 130 of a first row 139 are positioned at a first set of angular positions with respect to the axis A-A, and the holes 130 of the next axially succeeding row 139 are positioned at a second set of angular positions that are rotationally or angularly offset from the first set of angular positions.

After the modified casing 120 has been formed as described above, an explosive charge or material 150 is placed in modified casing 120 (Block 216) (e.g., using the explosive installation station 208). The explosive material 150 may be placed in the cavity 118 of the modified casing 120. The explosive material 150 may partially or fully fill the cavity 118. The explosive material 150 may be placed in modified casing 120 using any suitable technique.

Figure 3:
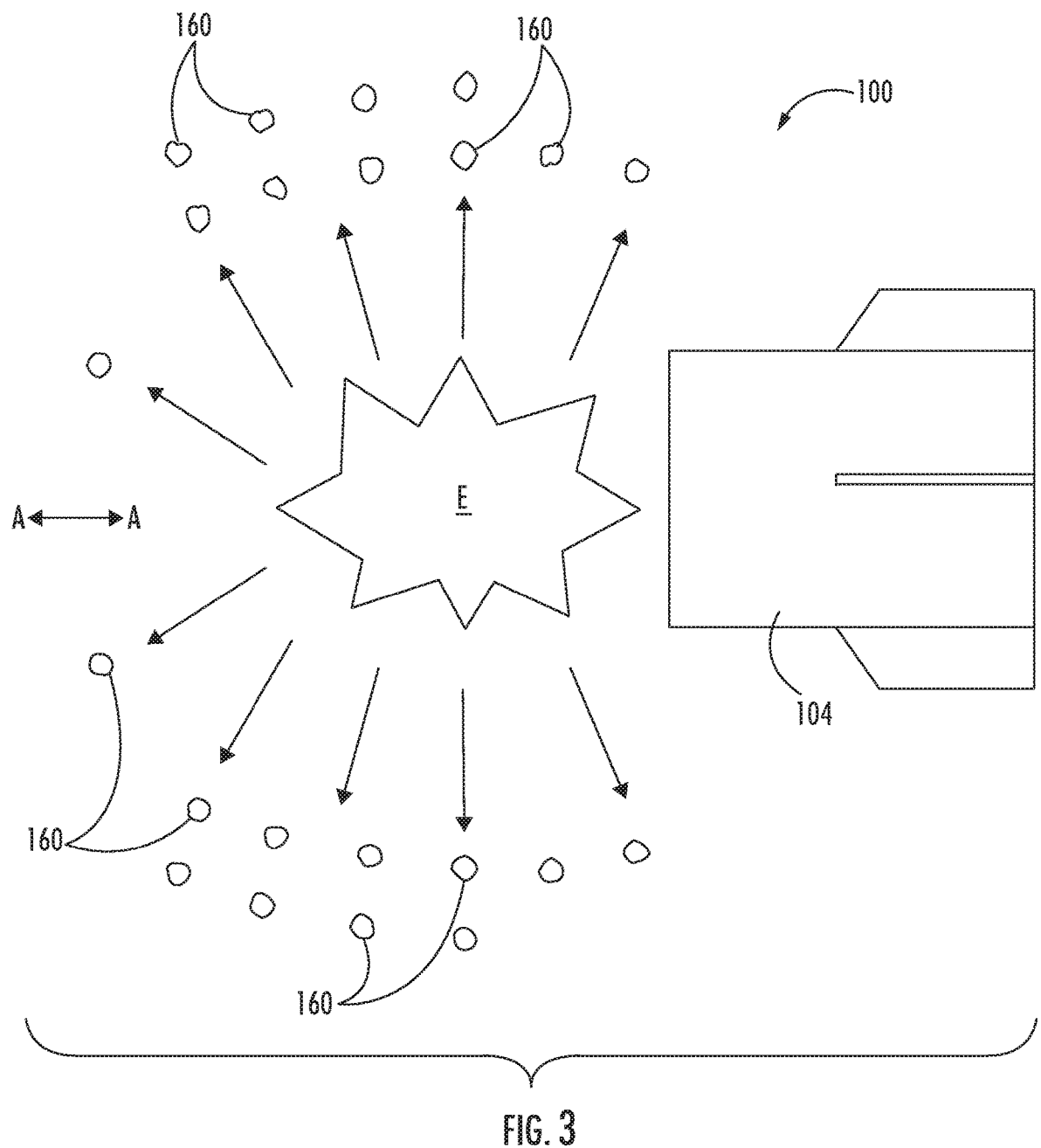
FIG. 3 is a side view of the munition of FIG. 1, wherein the munition has been detonated and fragments of a modified casing of the munition are explosively projected from the munition.

In use, the munition 100 can be exploded (as shown in FIG. 3) to apply a lethal or destructive force to a target using high energy projectiles 160 of the munition 100. More particularly, the detonated explosive charge 150 generates an explosion energy or force E that breaks the modified casing into naturally fragmented projectiles 160 and ejects the fragments 160 outwardly. In some embodiments, when the explosive charge 150 is detonated, a shock wave (i.e., a discontinuity in density, pressure, and temperature which advances through a material with a velocity corresponding to the maximum pressure of the pulse) propagates from the explosion. Shock waves are characterized by a wave moving at a velocity higher than the sound speed in a given material. The explosion energy in the form of the shock wave and/or expansion of gases generated by the explosive charge 150 will cause the modified casing 120 to fracture, break, fragment or shatter into a plurality of fragments 160 that constitute the projectiles. The mass, size, shape, and pattern of the projected fragments 160 is determined, at least in part, by the dimensions and pattern of the holes 130.

In some embodiments, the fragments 160 are projected from the munition at a velocity of at least about 700 meters/second (and, in some embodiments, 700-2000 m/s) when the explosive charge 150 is detonated.

In some embodiments, the ratio of the mass of the modified casing 120 to the mass of the explosive charge 150 is in the range of from about 1.5 to 3.0.

In some embodiments, the fragments 160 each have a mass in the range of from about 0.5 grams to 250 grams.

In some embodiments, the fragments 160 have an average total edge length (per fragment) in the range of from about 0.5 to 1.5 inches.

In some embodiments, the number of fragments 160 generated when the munition is detonated is in the range of from about 250 to 10,000 fragment projectiles 160.

Any suitable explosives may be used for the explosive charge 150. In some embodiments, the explosive charge 150 is a high energy (HE) explosive. Suitable HE explosives may include plastic bonded military grade types, including, PBXN-109, PBXN-110, CL-20, and AFX-757.

Any suitable initiation mechanism(s) may be used to detonate the explosive charge 150.

Figure 10:
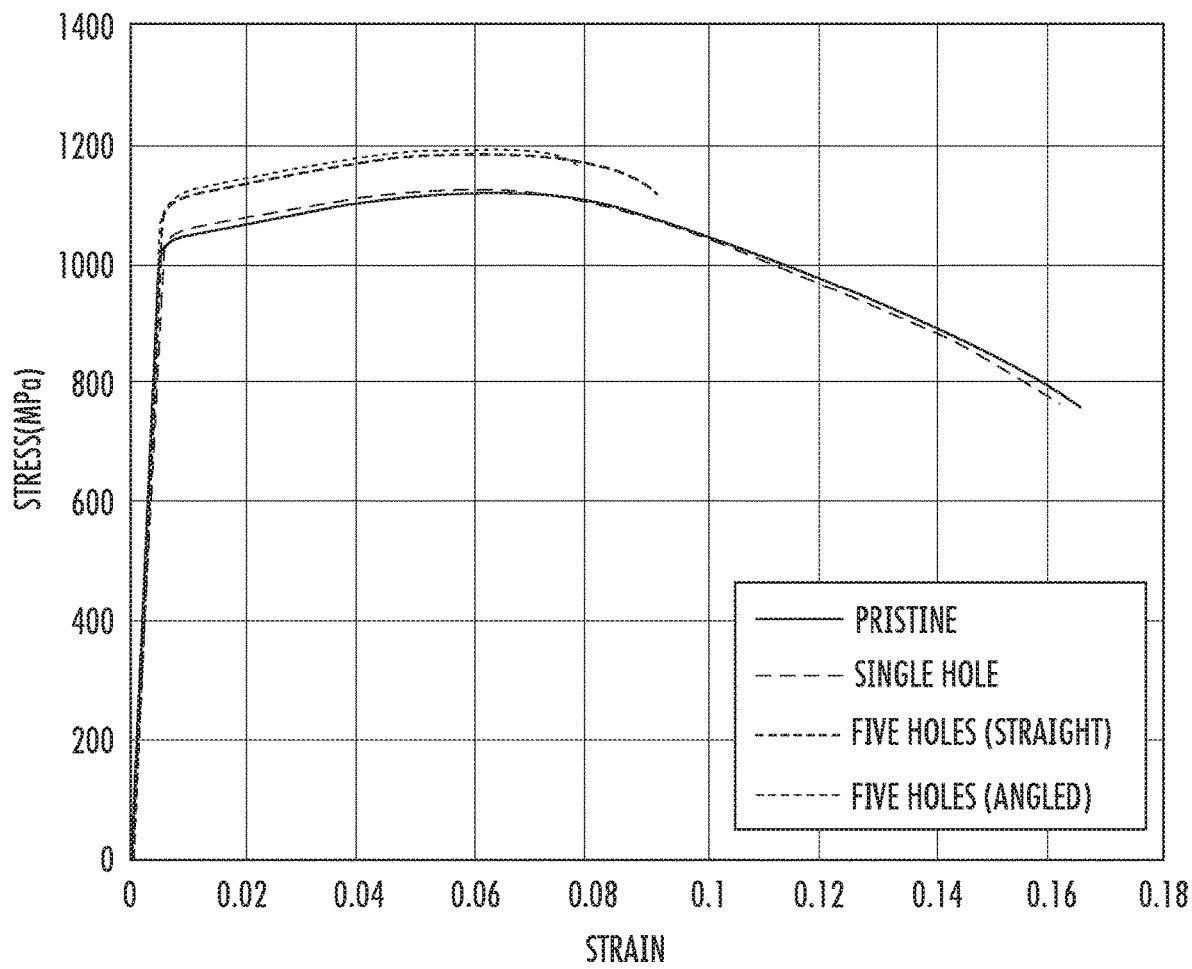
FIG. 10 is a graph representing experimental engineering stress-strain curves for four different constructions of a metal munition casing.

The inventors have found through both numerical simulation and physical testing that the number of microholes can be chosen such that the elastic modulus, yield strength, and ultimate strength remain substantially unaffected by the microholes. This allows the munition to be used without imposing extra handling or usage restrictions that would limit its utility. FIG. 10 represents experimental engineering stress-strain curves for four different constructions of a tensile test bar believed to be representative of a section of a metal munition casing, and demonstrates the preservation of ultimate strength of the casing. The "Pristine" curve corresponds to a tensile test bar (and a corresponding casing or section of a casing) in which no holes are formed. The "Single Hole" curve corresponds to a tensile test bar (and corresponding casing) of the same construction, except wherein a single EDM-formed microhole 130 has been formed. The "Five Holes (Straight)" curve corresponds to a tensile test bar (and a corresponding casing) of the same construction as "Pristine", except wherein five EDM-formed microholes 130 have been formed in the tensile test bar and are distributed in a straight line perpendicular to the axis of loading. The "Five Holes (Angled)" curve corresponds to a tensile test bar (and a corresponding casing) of the same construction as "Pristine", except wherein five EDM-formed microholes 130 have been formed in the tensile test bar and are equally distributed along a line that is 20° from perpendicular to the loading axis.

The inventors have found that the hole pattern and hole spacing have a significant effect on the fragment breakup. A comparison of the debris scene (i.e., the spatial distribution of the fragments shortly after detonation and fragmentation) for both a "pristine" munition and a drilled (offset hole pattern) munition is presented in FIGS. 11 and 12.

Figure 11:
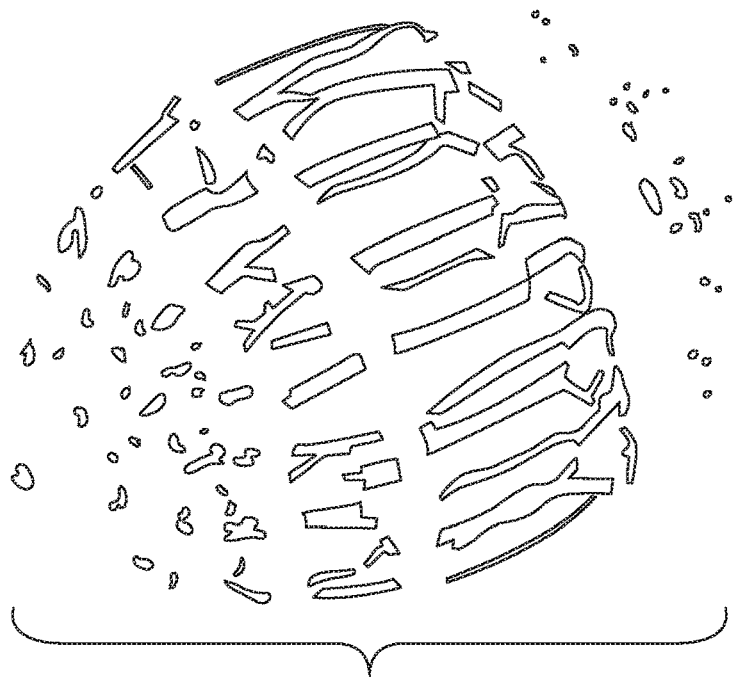
FIG. 11 is an illustration of a numerically-simulated debris scene for a munition constructed without holes in the casing thereof.
Figure 12:
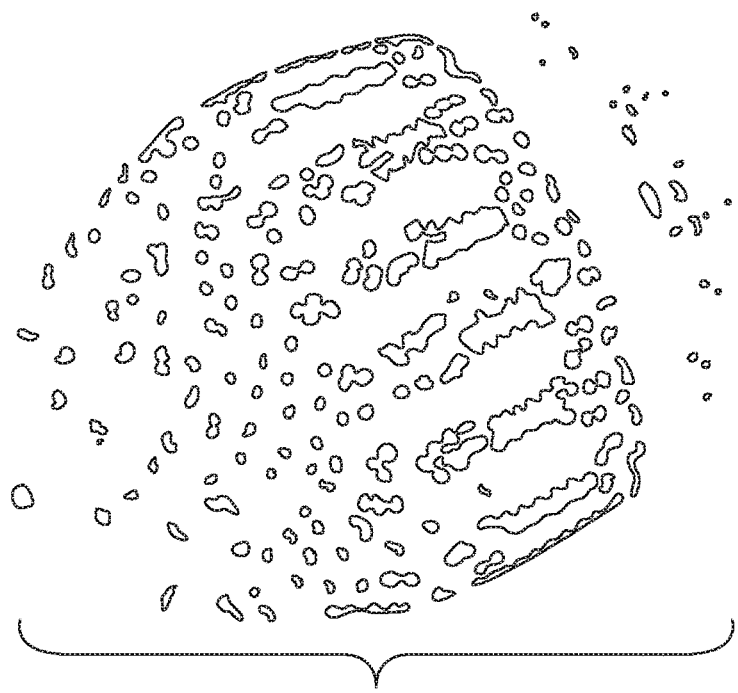
FIG. 12 is an illustration of a numerically-simulated debris scene for the munition of FIG. 1.

FIG. 11 shows a computer- or numerically-simulated debris scene for a munition constructed as shown and described for the munition 100, except that no holes have been formed in the casing 110 so that the casing of the munition is unmodified or "pristine". FIG. 12 shows a computer- or numerically-simulated debris scene for a munition 100 constructed as shown and described for the munition 100, including a modified casing 120 having microholes 130 defined therein in an offset hole pattern (sequential rows of holes are rotated by an offset angle from one another as discussed with reference to FIG. 2). The inventive munition 100 may have significantly better performance than a munition with straight columns of consecutive holes that run parallel to the lengthwise axis of the casing. The hole pattern could be optimized further. The depth and spacing of these microholes is a function of the munition casing thickness and its intended use case.

In some embodiments, the munition (e.g., the munition 100) is a penetration munition and the warhead (e.g., the warhead 102) is a penetration warhead. For example, in some embodiments, the munition and warhead incorporating a casing with micro-holes as disclosed herein is an earth-penetrating or bunker buster-type munition. In this case, the munition is designed to penetrate into a medium at least a prescribed distance (e.g., a few meters) before being exploded. As discussed above, the techniques according to embodiments of the present invention can be used to manufacture a warhead casing having improved fragmentation performance without substantially reducing the ultimate strength of the casing. As a result, a penetration warhead including a modified casing as described herein can more reliably or effectively bear the load of penetrating the medium without breaking apart prior to detonation.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A method for forming a fragmentation explosive munition, the method comprising:
   providing a casing; and
   forming microholes in the casing using electrical discharge machining (EDM), thereby forming a modified casing;
   wherein each of the microholes provides an initiation site in the modified casing for fracture of the modified casing as the modified casing expands under explosive loading;
   wherein the microholes each have a length to diameter ratio of at least 50 to 1; and
   wherein an elastic modulus, a yield strength, and an ultimate strength of the casing remain substantially unaffected by the microholes.

2. The method of claim 1 wherein the casing is formed of metal.

3. The method of claim 2 wherein the metal includes a metal selected from the group consisting of steel and titanium.

4. The method of claim 1 wherein the casing has an outer surface and forming microholes in the casing includes forming the microholes in the outer surface.

5. The method of claim 1 including heat treating the casing prior to forming the microholes.

6. The method of claim 1 including filling the modified casing with explosive material after forming the microholes.

7. The method of claim 6 wherein the explosive material is a high energy (HE) explosive.

8. The method of claim 1 wherein the microholes each have a depth in the range of from about 25% to 75% of a thickness of the casing.

9. The method of claim 1 wherein the microholes each have an inner diameter in the range of from about 100 µm to 600 µm.

10. The method of claim 1 wherein the microholes each have:
    a depth in the range of from about 25% to 75% of a thickness of the casing; and
    an inner diameter in the range of from about 100 µm to 600 µm.

11. The method of claim 1 wherein forming microholes in the casing includes forming the microholes in the casing using a hole drilling electrical discharge machine.

12. The method of claim 1 wherein the casing is substantially tubular.

13. The method of claim 1 wherein the casing has a substantially cylindrical, conical or frustoconical outer surface.

14. The method of claim 1 wherein forming microholes in the casing includes forming the microholes in the casing in an offset pattern.

15. The method of claim 14 wherein the offset pattern includes a plurality of sequential rows of the microholes, and at least one of the sequential rows is rotationally offset about a munition axis with respect to at least one adjacent one of the sequential rows.

16. The method of claim 1 wherein forming microholes in the casing includes forming the microholes such that the spacing between adjacent microholes is in the range of from about 0.1 inch to 5 inches.

17. The method of claim 1 wherein:
    the method includes filling the modified casing with a high energy (HE) explosive; and
    the microholes each have an inner diameter in the range of from about 100 µm to 600 µm.

18. The method of claim 17 wherein forming microholes in the casing includes forming the microholes such that the spacing between adjacent microholes is in the range of from about 0.1 inch to 5 inches.

19. A method for forming a munition casing, the method comprising:
    providing a casing; and
    forming microholes in the casing using electrical discharge machining (EDM), thereby forming a modified casing;

wherein each of the microholes provides an initiation site in the modified casing for fracture of the modified casing as the modified casing expands under explosive loading;

wherein the microholes each have a length to diameter ratio of at least 50 to 1; and wherein an elastic modulus, a yield strength, and an ultimate strength of the casing remain substantially unaffected by the microholes.

\* \* \* \* \*